United States Patent
Garakani et al.

(10) Patent No.: US 7,639,403 B2
(45) Date of Patent: *Dec. 29, 2009

(54) TECHNIQUE FOR CONNECTING FAX MACHINES WITH ADVANCED CAPABILITIES OVER A NETWORK WHICH IS NOT ADAPTED TO HANDLE CERTAIN PROTOCOLS

(75) Inventors: Mehryar Khalili Garakani, Westlake Village, CA (US); Hanh Luong, Santa Barbara, CA (US); Brooks S. Read, Concord, MA (US); Steven J. White, San Mateo, CA (US); Ilya Umansky, San Jose, CA (US); Herbert M. Wildfeuer, Santa Barbara, CA (US)

(73) Assignee: Cisco Technology, Inc., San Jose, CA (US)

( * ) Notice: Subject to any disclaimer, the term of this patent is extended or adjusted under 35 U.S.C. 154(b) by 1002 days.

This patent is subject to a terminal disclaimer.

(21) Appl. No.: 11/058,491

(22) Filed: Feb. 14, 2005

(65) Prior Publication Data

US 2005/0168785 A1 Aug. 4, 2005

Related U.S. Application Data

(63) Continuation-in-part of application No. 10/743,980, filed on Dec. 22, 2003.

(51) Int. Cl.
*H04N 1/04* (2006.01)
(52) U.S. Cl. ............... 358/407; 358/442; 358/434; 379/100.17; 379/93.31; 370/352; 370/389

(58) Field of Classification Search ............... 358/1.15, 358/442, 402, 403, 434, 426.16; 379/100.17, 379/93.31, 142.28, 227; 370/352, 321, 401, 370/389
See application file for complete search history.

(56) References Cited

U.S. PATENT DOCUMENTS

| | | | | |
|---|---|---|---|---|
| 5,719,688 | A * | 2/1998 | Kagami | 358/468 |
| 6,122,071 | A * | 9/2000 | Yoshida | 358/434 |
| 6,292,509 | B1 * | 9/2001 | Fujino | 375/222 |
| 6,449,349 | B1 * | 9/2002 | Higuchi | 379/100.17 |
| 6,563,217 | B2 * | 5/2003 | Corisis et al. | 257/738 |
| 7,038,800 | B2 * | 5/2006 | Ono et al. | 358/1.15 |

OTHER PUBLICATIONS

Pete Davidson, Davidson Consulting; *V.34 Fax: Superior Performance and Cost Savings*; Feb. 2003; 6 pages including title and credit page.

(Continued)

*Primary Examiner*—Houshang Safaipour
*Assistant Examiner*—Negussie Worku
(74) *Attorney, Agent, or Firm*—Marger Johnson & McCollom, P.C.

(57) ABSTRACT

An improved method and system for connecting Super Group 3 fax machines over network gateways that operate using the un-enhanced T.38 protocol. With the present invention, the CM tone is suppressed. Thus a gateway that generates an AnsAm tone, will not receive a CM tone in response. The T.38 protocol does not specify what occurs if a CM tone is not received; however, it has been found that, in practice, existing fax machines fall back to V.21 mode if a CM tone is not received.

20 Claims, 3 Drawing Sheets

OTHER PUBLICATIONS

Dr. Frank Gao, GAO Research and Consulting; *Modem and Fax Standards and Software*; Copyright 1996-2003; pp. 1-8.
Applied Signal Technology, Inc.; *Interpreting the Group 3 FAX Set-up Protocol*; copyright 1989; Chapter 2.0 pp. 1-3.
Data Network Resource; *Voice Networks, Voice Over IP, IP Telephony*; pp. 1-49.
AudioCodes; *Fax Relay over Packet Networks*; Dec. 25, 2002; pp. 1-18.
Cisco IOS Fax Services over IP Application Guide; Fax Services over IP Overview, pp. 1-24.
H. Schulzrinne; S. Petrack; T. Taylor; *Definition of Events for Modem FAX, and Text Telephony Signals*, Feb. 17, 2005; pp. 1-41.

\* cited by examiner

Figure 1A    Network Configuration
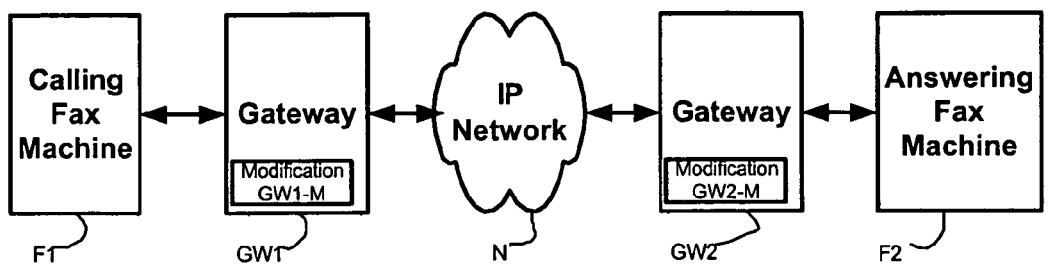
Figure 1B
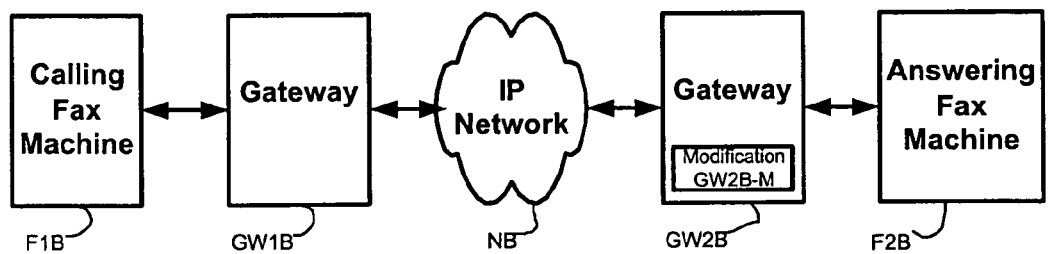

TECHNIQUE FOR CONNECTING FAX MACHINES WITH ADVANCED CAPABILITIES OVER A NETWORK WHICH IS NOT ADAPTED TO HANDLE CERTAIN PROTOCOLS

RELATED APPLICATION

The present application is a continuation-in-part of U.S. patent application Ser. No. 10/743,980 filed Dec. 22, 2003 (c-316). Priority of prior application Ser. No. 10/743,980 filed Dec. 22, 2003 (c-316) is hereby claimed. The entire content of application Ser. No. 10/743,980 filed Dec. 22, 2003 (c-316) is hereby incorporated herein by reference

FIELD OF THE INVENTION

The present invention relates to packet networks and more particularly to inter connecting fax machines over an IP network.

BACKGROUND OF THE INVENTION

In the past, fax machines were generally interconnected using conventional analog telephone circuits operating using a time division multiplex protocol (hereinafter called TDM). However, currently, many fax messages are transmitted over packet networks. When fax machines are interconnected over a packet network, the initial connection is typically made using a voice grade connection. Subsequently, when the actual fax transmission begins, the network connection generally switches to a protocol known as fax relay.

Fax machines known as Group 3 fax machines are capable of operating at top speed of 14,400 bits per second (hereinafter bps). More modern fax machines, known as Super Group 3 fax machines are capable of operating at speeds of up to 33,600 bps. In general, Group 3 fax machines utilize a protocol known as the V.21 fax protocol and Super Group 3 fax machines utilize a protocol known as the V.34 half duplex protocol. The V.21 and V.34 protocols are standard protocols that have been documented and published by International Telecommunication Union standard committees.

When fax machines are connected over a TDM circuit, the calling machine initially tries to connect at the highest speed at which the fax machine is capable of operating. If a connection can not be made at that speed, the machine typically "falls back" and tries to make a connection at a slower speed. For example, when a V.34 Super Group 3 fax machine connects to a Group 3 fax machine over a TDM circuit, the Super Group 3 fax falls back in speed and operates at the speed of the Group 3 machine.

When V.34 fax machines initially contact each other, they use the V.8 protocol. According to the V.8 protocol, the answering fax machine (hereinafter sometime referred to as the called fax machine or as the second fax machine) generates a AnsAm tone (that is, a 2100 Hz tone with a 15 Hz envelope). The AnsAm tone tells the first fax machine that the second fax machine is V.8 capable. In response to the AnsAm tone, the first fax machine generates a Call Menu (CM) tone. The CM tone includes a set of all the fax modulations supported by the first fax machine. When the second fax machine receives the CM tone, it replies with a Joint Menu (JM) signal that indicates the particular modulation selected for that particular call, that is, the highest speed at which both machines can operate.

Fax machines connected over packet networks are generally connected using a protocol known as the T.38 protocol that includes a fax relay protocol. In May 2003, the T.38 fax relay protocol was extended to support the V.34 speed of 33,600 bps, that is the speed used by Super group 3 fax machines. However, many of the T.38 gateways that are presently deployed have not been upgraded to handle the V.34, 33,600 bps speed, in fax relay mode. Hereinafter, the following terms will be used with the following meanings:

1) Enhanced T.38 Protocol: The T.38 protocol which has been enhanced to handle V.34, 33,600 bps speed, in fax relay mode, will be referred to as the enhanced T.38 protocol.
2) Un-enhanced T.38 protocol: The T.38 protocol which has not been enhanced to handle V.34 speed, in fax relay mode, will be called the un-enhanced T.38 protocol.
3) Enhanced T.38 Gateway: A Gateway operating according to the enhanced T.38 protocol will be referred to as an enhanced T.38 Gateway.
4) Un-enhanced T.38 Gateway: A Gateway operating according to the un-enhanced T.38 protocol will be referred to as an un-enhanced T.38 Gateway.

Prior co-pending application Ser. No. 10/743,980 filed Dec. 22, 2003 (c-316) describes a method and system for connecting V.34 enabled fax machines (that is fax machines capable of operating at 33,600 bps) over network gateways that use the un-enhanced T.38 protocol. With the method and system described in application Ser. No. 10/743,980, either the AnsAm signal or the CM signal is modified so that the fax machine falls back to a non V.34 protocol and operates at a slower speed which the un-enhanced T.38 gateway is capable of handling.

The above described technique functions if the fax machines involved conform to the appropriate standards; however, it has been found that some of the fax machines that are in widespread use do not function as specified by the various standards and with some of the fax machines in widespread use, the above described technique does not always operate satisfactorily.

SUMMARY OF THE PRESENT INVENTION

The present invention provides an improved method and system for connecting Super Group 3 fax machines over a network at least some part of which operates using the un-enhanced T.38 protocol. That is, the present invention provides an improved method and system for operating super group 3 fax machines over a network that has not been upgraded to handle the V.34, 33,600 bps protocol in fax relay mode.

With the present invention, the CM tone is suppressed. Thus, a gateway that generates an AnsAm tone, will not receive a CM tone in response. The V.8 protocol does not specify what occurs if a CM tone is not received; however, it has been found that, in practice, many existing fax machines fall back to group 3 mode if a CM tone is not received.

BRIEF DESCRIPTION OF THE FIGURES

FIGS. 1A and 1B are system diagrams of a first and a second embodiment of the invention.

DETAILED DESCRIPTION

Figure 2:
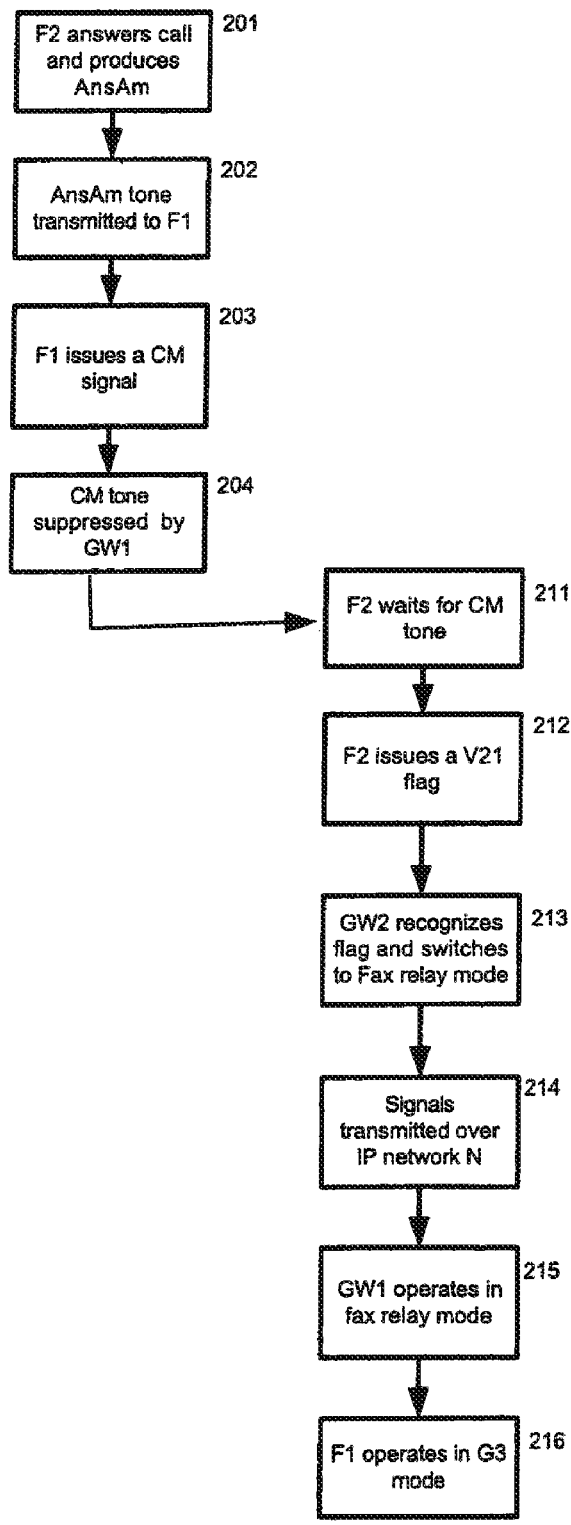
FIG. 2 is a block flow diagram showing the operation of a first embodiment of the invention.

Several preferred embodiments of the present invention are described below with reference to the drawings listed above.

The drawings illustrate exemplary preferred embodiments of the invention and the operation of such embodiments. It should, however, be noted that this invention may be embodied in many different forms and the inventions should not be construed as being limited to the embodiments set forth herein.

The following description conveys, in full, clear, and concise terms, to one skilled in the art, how to make and use the invention. In the drawings, the size of the boxes is not intended to represent the size of the various physical components. The same reference numerals are used to denote the same elements throughout the drawings.

Only the parts of the various units that are relevant to an explanation of the present invention are shown and described herein. It should be understood that the units shown the drawings and described herein have other conventional parts and operations, in addition to those shown and described herein. Such conventional parts and operations are known to those skilled in the art.

An overall diagram of a first embodiment of the invention is shown in FIG. 1. The embodiment shown in FIG. 1 includes two fax machines designated F1 and F2. Fax machine F1 is connected to a Gateway designated GW1 and fax machine F2 is connected to a gateway GW2. The two gateways GW1 and GW2 are connected via an IP network N. The network N can be the Internet. Conventional ITPS packets can be sent from GW1 to GW2, and from GW2 to GW1 via network N in a conventional manner.

The standards that define fax machine protocols originate with the International Telecommunications Union's Telecom Standardization Section. Relatively old fax machines operate according to protocols known as V.17 and V.21.

A standard for modems, which is designed to operate at a faster speed, and which is known as the V.34 standard for modems, was approved by the International Telecommunications Union's Telecom Standardization Section in September 1994. The V.34 standard for fax was not approved until three years later, in 1997. While the standard for fax was approved in 1997, fax machines which implemented the V.34 standard for fax, did not appear in large numbers until about 2001.

Fax machines that implement the V.34 standard are often referred to as Super Group 3 fax machines. Fax machines using the V.34 fax standard (that is, Super Group 3 fax machines) transmit fax data more than twice as fast as the transmission speed of machines that operate according to the prior V.17 (14.4 Kbps) protocol standard.

The overall time required to transmit a fax document can be divided into two parts. The first part of the process is a handshaking process during which two fax machines coordinate how they will coordinate their operate during the second part of the process. The second part of the process is the actual data transmission process. The V.34 fax protocol standard supports handshaking, using what is known as the V.8 protocol. The V.17 and the V.21 protocols do not use the V.8 protocol and instead they use a different type of handshaking procedure.

The present invention relates to fax machines that are connected to each other over a packet switched network. However, in order to facilitate an explanation of the present invention it is useful to first describe how fax machines communicate over a conventional POTS (Plain Old Telephone Service) telephone line using the PSTN (Public Switched Telephone Network).

Two examples will be given showing how different types of fax machines handshake over a POTS connection. The first example explains how two older fax machines connected over a POTS line perform a handshaking procedure, using the V.17 or V.21 protocols. The second example explains how two V34 fax machines connected over a POTS line perform handshaking.

The example showing how two V.17 or V.21 fax machines connect over a POTS line will utilize the following terms:

CED (Called Subscriber Identifier): A 2100 Hz tone generated by a Group III fax machine when it answers a call.

DIS signal (Digital Identification Signal): A 1750 Hz FSK signal, with an HDLC frame structure, which indicates the answering fax machine's capabilities.

DCS signal (Digital Command Signal): A signal issued by the calling fax in response to a DIS signal.

CFR signal (Confirmation to Receive Signal): A signal that indicated whether or not the DCS and training signals have been successfully received.

Two older fax machines perform a handshaking procedure using the V.17 or V.21 protocols over a POTS line perform the following type of operations.

1) Machine F1 calls machine F2 using a standard telephone calling procedure.
2) Machine F2 answers and issues a CED signal followed by a DIS signal. The DIS signal indicates the answering fax machines capabilities.
3) The calling machine F1 issues a DCS signal in response to the DIS signal. The DCS signal indicates what type of coding and resolution will be used for the call.
4) The answering machine F2 issues a CFR signal to indicate whether or not the DCS and training signals have been successfully received.
5) The message is then transmitted.

Next, an example will be given to show how two V34 enabled fax machines perform handshaking using a conventional POTS telephone line. This explanation will use the following abbreviations:

AnsAm signal: A 2100 Hz tone, with phase reversals at 450 ms intervals, and a 15 Hz amplitude modulation.

CM signal: A FSK modulated signals at 300 b/s. The CM signal carries information concerning what protocols are supported by the fax machine that transmitted the signal JM signal: A signal similar in nature to the CM signal which carries information concerning which protocol should be used for a call.

Two V34 enabled (Super Group 3) fax machines that perform a handshaking procedure over a POTS line perform the following steps:

1) Machine F1 calls machine F2 using a standard telephone calling procedure.
2) Machine F2 answers and issues an AnsAm signal.
3) When machine F1 receives the AnsAm signal, it issues a CM signal. The CM signal carries information concerning what protocols are supported by fax machine F1.
4) When machine F2 receives the CM signal, it decides which protocol to utilize and it issues a JM signal. The JM signal carries information concerning which protocol should be used.
5) When Machine F1 receives the JM signal it switches to the protocol specified by the JM signal and it begins transmitting fax information.

Recently, packet switched networks have come into widespread use. When two fax machines are connected via a packet network, the initial call from the first fax machine to the second fax machine is a voice type connection. However, once the fax transmission begins, the gateways switch to a special fax protocol.

The un-enhanced T.38 protocol can not handle fax communication at the speed of Super Group 3 fax machines. That is, the fax protocol in the un-enhanced T.38 protocol can not operate at the speed of Super Group 3 fax machines. The enhanced T.38 protocol can handle fax protocol at the transmission speed of Super Group 3 fax machines. In existing networks, there are many routers operating using the un-enhanced T.38 protocol. The present invention is directed to the problem presented when Super Group 3 fax machines attempt to communicate using the un-enhanced T.38 protocol.

In the first embodiment of the invention, shown in FIG. 1A, both the gateway GW1 and the gateway GW2 have been enhanced to perform the operations specified by the present invention. In a second embodiment of the invention, shown in FIG. 1B, only one of the gateways has been enhanced to perform the operations specified by the present invention. If only one of the gateways is enhanced, it can be either one of the gateways.

The embodiment of the invention shown in FIG. 1A will be described first. FIG. 1A shows two Super Group 3 fax machines F1 and F2. When two super Group 3, V.34 enabled fax machines connect over an IP network, using the T.38 protocol, the initial V.8 handshaking is typically done over a voice connection. Once the handshaking is complete and data transmission begins the system switches to T.38 fax relay mode.

Two V.34 enabled fax machine which are connected via gateways and an IP network, can handshake over a voice connection and decide to operate at 33,600 bps according to the V.34 protocol. However, if the gateways to which they are connected have not been enhanced (that is, if the gateways can not handle 33,600 bps in fax relay mode), the call will fail. Furthermore, since the handshaking operation (which took place over a voice connection) is already complete, the fax machines can not fall back to a lower speed.

In the first embodiment, shown in FIG. 1A, the gateways GW1 and GW2 are conventional gateways that have been slightly modified by adding the additional programming designated GW1-M and GW2-M. The functions performed by the additional programming GW1-M and GW2-M will be described below.

The gateways GW1 and GW2 may, for example, be the type of gateway marked by The Cisco Corporation under the family designation AS53xx, 26xx, 28xx, 37xx, 38xx, etc. Alternatively, they could be various other commercially available un-enhanced T.38 gateways. In this first embodiment of the invention a small amount of code has been added to the gateways (designated GW1-M and GW2-M) to suppress the transmission of a CM signal.

If fax machine F1 is the calling fax machine and fax machine F2 is the answering fax machine, machine F2 will generate an AnsAm signal and this signal will be transmitted to machine F1. Machine F1 will then generate a CM signal.

With the present invention the CM signal is suppressed by gateway GW1. That is, the CM signal is not transmitted to the gateway GW2. In practice, it has been found that, if a CM signal is not received, the great majority of fax machines will drop back and begin operating as group 3 fax machines. That is, if the expected CM signal does not arrive after some period of time, the answering machine will begin operating as a group 3 fax machine, and it will issue a CED signal. The time period that the machines waits for the CM signal before it issues a CED signal is usually in the order of several seconds. Once the CED signal is issued, the calling fax machine will fall back to group 3 mode of operation and proceed to connect at the slower speed.

FIG. 2 is a block programming flow diagram illustrating the operation of the system shown in FIG. 1A. That is, FIG. 2 shows the operations performed by the programming code, GW1-M or GW2-M. The operations shown in FIG. 2 are coded in accordance with the programming language used by any particular system in a conventional manner.

The process begins as indicated by block 201 when machine F2 answers a call from fax machines F1. Such a call would be placed in a conventional manner over network N using a voice connection. After the call is answered, machine F2 issues an AnsAm tone as indicted by block 201. The AnsAm tone is transmitted to machine F1 over the voice connection as indicated by block 202.

When gateway GW1 detects a CM tone, the code in gateway GW1 suppresses the CM signal and the CM signal is not transmitted to machine F2. Machine F2 expects to receive a CM tone (since it issued an AnsAm tone) and, as indicated by block 211, machine F2 waits for a certain period of time. Once the wait period is finished, machine F2 falls back to V.21 mode and issues a V21 flag as indicated by block 212.

As indicated by block 213, GW2 recognizes the V.21 flag and it switches to Fax relay mode. The flags are transmitted over the IP network to F1 as indicated by block 214. GW1 will also switch to fax relay mode as indicated by block 215.

The V21 flag will be transmitted to F1. F1 will then begin operating in G3 mode. The result is that while F1 and F2 are Super Group 3 fax machines, in order to operate through a network that utilizes the un-enhanced T.38 protocol, machines F1 and F2 operate as slower group 3 machines.

Figure 3:
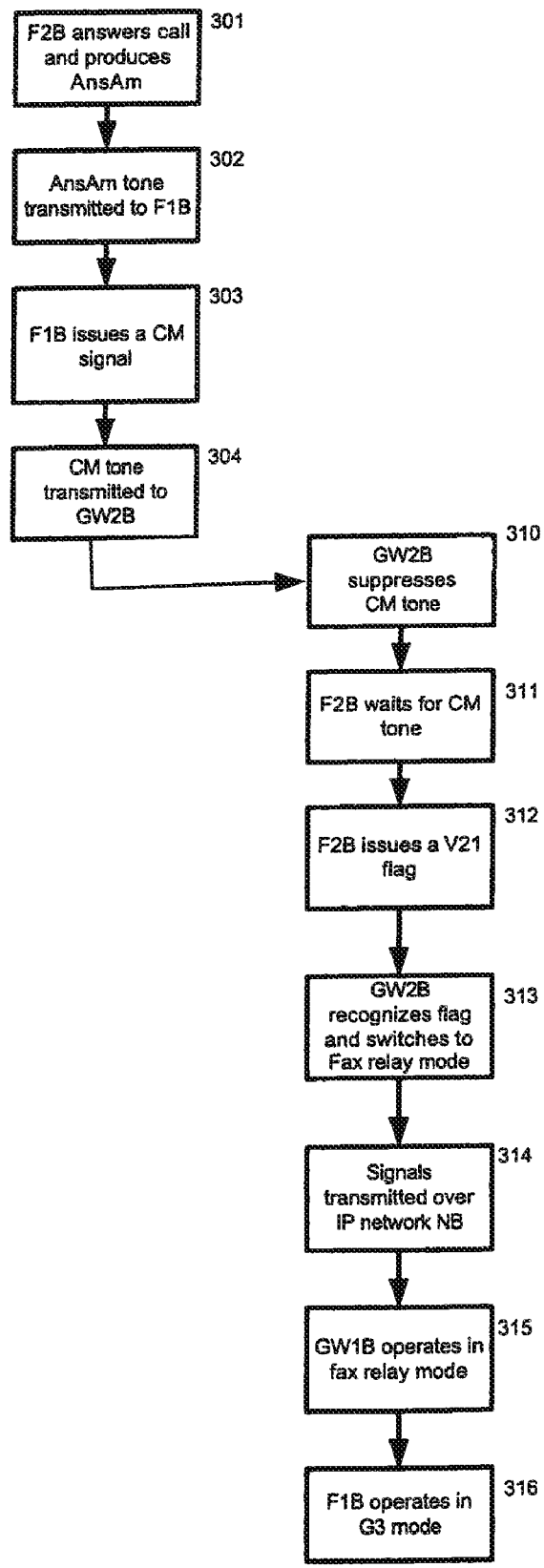
FIG. 3 is a block flow diagram showing the operation of a second embodiment of the invention.

FIG. 1B and FIG. 3 relate to a second embodiment of the invention. As shown in FIG. 1B, the second embodiment includes two Super Group 3 fax machines F1B and F2B. The fax machines F1B and F2B are respectively connected to gateways GW1B and GW2B. Gateways GW1B and GW2B can transmit and receive IP packets via network NB.

In this second embodiment, only gateway GW2B includes modified code in accordance with the present invention. Again, in this second embodiment the fax machines are Super Group 3 fax machines; however, as will be explained, they will drop down and operate as group 3 fax machines when connecting through network NB.

The calling operation begins as in the first embodiment as indicated by blocks 301, 302 and 303. That is, the machine F2 generates an AnsAm tone that is transmitted to machine F1 and then machine F1 issues a CM signal. However, in this second embodiment, since GW1B does not have the modified code of the present invention, the CM signal is in fact transmitted to gateway GW2B as indicated by block 304.

As indicated by block 310, gateway GW2B, suppresses the CM tone and the CM tone is not transmitted to fax machine F2. The operation then proceeds as shown in FIG. 1. That is F2 waits for the CM tone and ten times out and issues a V21 flag as indicated by block 312. The gateway switches to fax relay mode and when GW1B receives the flag, it switches to G3 mode as indicated by blocks 214, 215 and 216. It is noted that while FIG. 1B shows only gateway GW2 as having the enhanced code, in another alternate embodiment, only gateway GW1 includes the enhanced code. In either embodiment the CM tone is suppressed by the gateway with the enhanced code.

In summary, with the present invention, two super group 3 fax machines operate in group 3 mode. The answering fax machine issues an AnsAm tone and when the calling fax machine receives the AnsAm tone, it issues a CM tone. However, the CM tone is not transmitted to the answering fax machine. The answering fax machine waits for the CM tone (since it has issued an AnsAm tone) but it finally times out and switches to G3 fax mode. It then issues a V21 flag and the fax proceeds in group 3 mode even though both fax machines are super group 3 capable.

While the invention has been shown and described with respect to preferred embodiments thereof, it should be understood that various changes in form and detail can be made by those skilled in the art, without departing from the spirit and scope of the invention. The scope of the invention is limited only by the appended claims.

We claim:

1. A method of connecting a first V.34 enabled fax machine to a second V.34 enabled fax machine over a network utilizing at least one gateway that operates in accordance with the T.38 un-enhanced protocol, a method including the following steps during an initial handshaking process between said machines:
   placing a call by said first fax machine to said second fax machine over a voice grade connection,
   generating an AnsAm signal by said second fax machine in response to said call,
   transmitting said AnsAm signal to said first fax machine, said first fax machine generating a CM tone,
   suppressing said CM tone so that it does not reach said second fax machine, and
   said first and second fax machine falling back to the G3 speed and communicating using the G3 protocol.

2. The method recited in claim 1 wherein said network is an IP network.

3. The method recited in claim 1 wherein both of said fax machines are connected to said network by gateways that use the un-enhanced T.38 protocol.

4. The method recited in claim 1 wherein said first fax machine is connected to said network by a un-enhanced T.38 gateway and said second fax machine is connected to said network by an enhanced T.38 gateway.

5. The method recited in claim 1 wherein said second fax machine is connected to said network by a un-enhanced T.38 gateway and said first fax machine is connected to said network by an enhanced T.38 gateway.

6. The method recited in claim 1 wherein said initial handshaking is in accordance with the V.8 handshaking protocol.

7. A method of connecting a first V.34 enabled fax machine to a second V.34 enabled fax machine over a network that has one or more gateways that operate in accordance with the T.38 un-enhanced protocol, said fax machines having an initial handshaking process during which a CM signal is generated said method including:
   placing a call to said second fax machine by said first fax machine over a voice grade connection,
   generating an AnsAm signal by said second fax machine in response to said call,
   generating a CM signal by said first fax machine,
   suppressing said CM signal so that it does not reach said second fax machine,
   said second fax machine falling back to G3 mode, and
   said first and second fax machine communicate using the G3 protocol.

8. The method recited in claim 7 wherein said network is an IP network.

9. The method recited in claim 7 wherein both of said fax machines are connected to said network by gateways that use the un-enhanced T.38 protocol.

10. The method recited in claim 7 wherein said first fax machine is connected to said network by a un-enhanced T.38 gateway and said second fax machine is connected to said network by an enhanced T.38 gateway.

11. The method recited in claim 7 wherein said second fax machine is connected to said network by a un-enhanced T.38 gateway and said first fax machine is connected to said network by an enhanced T.38 gateway.

12. The method recited in claim 7 wherein said initial handshaking is in accordance with the V.8 handshaking protocol.

13. A method of connecting a first V.34 enabled fax machine to a second V.34 enabled fax machine over a network that includes a first gateway connecting said first fax machine to said network and a second gateway connecting said second fax machine to said network, said gateways operating in accordance with the T.38 un-enhanced protocol, said fax machines having an initial handshaking process during which an AnsAm signal is generated by said second fax machine and a CM signal is generated by said first fax machine, said method including:
   suppressing said CM signal so that said second fax machine does not receive said CM signal,
   said second fax machine falls back to G3 mode, and
   said first and second fax machine communicate using the G3 protocol.

14. A system including:
   a first V.34 enabled fax machine,
   a second V.34 enabled fax machine,
   a network connecting said first and second fax machines, said network including one or more gateways that operate in accordance with the T.38 un-enhanced protocol,
   said fax machines having an initial handshaking process during which an AnsAm signal and a CM signal is generated,
   a program in one of said gateways which suppresses transmission of said CM signal between said fax machines, and said second fax machine falls back to G3 mode, and
   said first and second fax machine communicate using the G3 protocol.

15. The system recited in claim 14 wherein said network is an IP network.

16. The system recited in claim 14 wherein both of said fax machines are connected to said network by gateways that use the un-enhanced T.38 protocol.

17. The system recited in claim 14 wherein said first fax machine is connected to said network by a un-enhanced T.38 gateway and said second fax machine is connected to said network by an enhanced T.38 gateway.

18. The system recited in claim 14 wherein said second fax machine is connected to said network by a un-enhanced T.38 gateway and said first fax machine is connected to said network by an enhanced T.38 gateway.

19. The method recited in claim 14 wherein said initial handshaking is in accordance with the V.8 handshaking protocol.

20. A system including:
   a first means operating according to the V.34 fax machine protocol,
   a second means operating according to the V.34 fax machine protocol,
   network means connecting said first and second fax machines, said network means including one or more gateways means that operate in accordance with the T.38 un-enhanced protocol,
   said first means having an initial handshaking process during which an AnsAm signal and a CM signal are generated,
   program means in one of said gateway means which suppresses transmission of said CM signal between said fax machines, and
   whereby said second means falls back to G3 mode, and said first and second means thereby fall back and communicate using the G3 protocol.

\* \* \* \* \*

UNITED STATES PATENT AND TRADEMARK OFFICE
CERTIFICATE OF CORRECTION

PATENT NO. : 7,639,403 B2 Page 1 of 1
APPLICATION NO. : 11/058491
DATED : December 29, 2009
INVENTOR(S) : Garakani et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1262 days.

Signed and Sealed this

Twenty-first Day of December, 2010

David J. Kappos
*Director of the United States Patent and Trademark Office*